D. M. Mefford.
Preserving Fruit.
Nº 86,433.                    Patented Feb. 2, 1869.
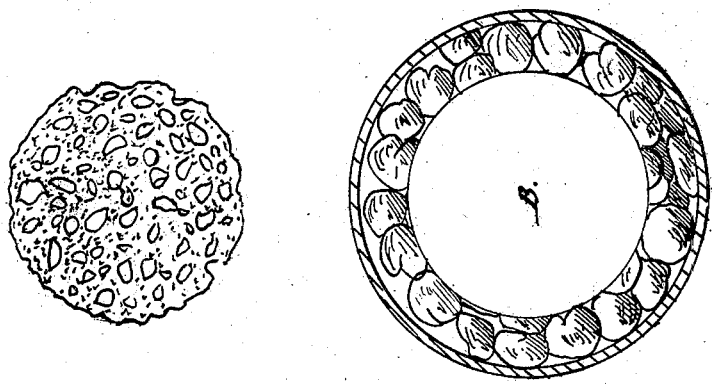
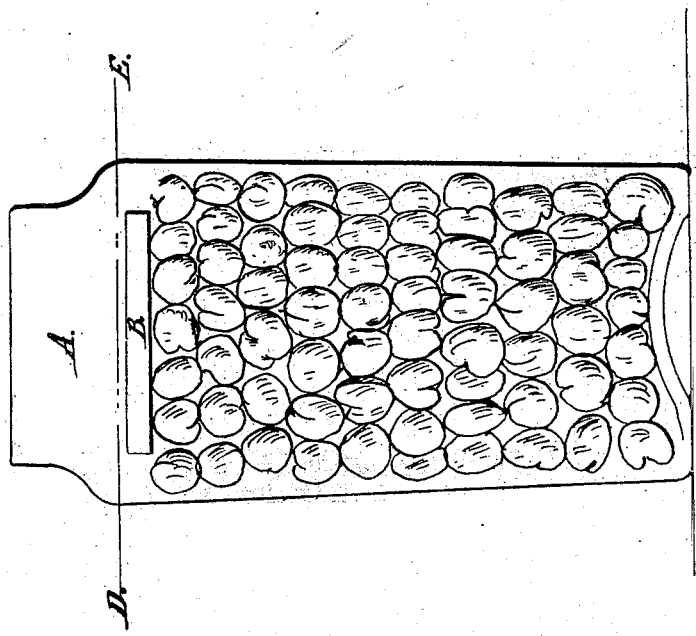
Witnesses:
Henry O. Parker
George W. States
Inventor:
David M. Mefford

UNITED STATES PATENT OFFICE.

DAVID M. MEFFORD, OF NORWALK, OHIO.

IMPROVED MODE OF PRESERVING FRUIT.

Specification forming part of Letters Patent No. 86,433, dated February 2, 1869.

*To all whom it may concern:*

Be it known that I, DAVID M. MEFFORD, of Norwalk, in the county of Huron and State of Ohio, have invented a new, useful, and Improved Mode of Preserving Fruit; and I do hereby declare that the following is a full and exact description thereof, reference being had to the accompanying drawings and the letters of reference marked thereon.

The nature of my invention consists in protecting the surface of scalded fruit in vessels exposed to atmospheric influences by keeping on it, or suspended immediately above it, a block of wood, a sponge or other porous substance, charged or saturated with sulphurous-acid gas, in order to counteract the oxygenating influence of the atmosphere, thereby preventing the fruit from fermenting and spoiling.

To enable others skilled in the art to make and use my invention, I will proceed to describe its construction and operation.

After preparing my fruits in the usual way, and scalding them so as to cause them to be heated through, I pour them into vessels which are water-tight, taking care that there is enough juice or liquor to cover them. I then take either blocks of wood (see drawings) B, sections of sponge C, or their equivalents, that have been previously charged or saturated with sulphurous-acid gas, and place them either on the surfaces of the fruits or suspend them immediately above, in close proximity thereto. I allow these to remain until the fruits show symptoms of molding. I then remove the blocks, sponges, or their equivalents, and recharge them with the gas and replace them on the jars as before. Should any mold form on the blocks, sponges, or fruits, it should be moved and the blocks or sponges should be thoroughly cleansed before subjecting them to the action of the sulphurous-acid gas.

It is not necessary that the block, sponge, or any equivalent thereof should cover the entire area of the surface of the fruit in a vessel which it is intended to protect, for the reason that the gas will pass out of the block or sponge and charge the entire surface of the fruit, and it becoming thus charged with the gas, acts as effectually in preventing the oxygen of the air from oxygenating the fruit as if the block or sponge were made to cover the entire area.

The method I have adopted for charging or impregnating the blocks, sponges, or their equivalents, with sulphurous-acid gas, is to moisten them with water and place them in a close vessel with burning sulphur. The gas created by the combustion of the sulphur, having a strong affinity for the water in the blocks or sponges, is absorbed by it, and thus they become thoroughly saturated with the gas.

As an example of an equivalent of the block or sponge, some of the fruit itself might be taken and charged with the gas and laid on the surface of the fruit in a jar. This would as effectually protect the fruit in the vessel as would a block or sponge charged with the gas and laid on or applied as aforesaid.

What I claim as my invention, and desire to secure by Letters Patent, is—

The preservation of fruit by protecting the surface of the same from the influence of the oxygen of the atmosphere, substantially as is above set forth.

DAVID M. MEFFORD.

Witnesses:
GEORGE W. STALES,
HENRY C. PARKER.